May 24, 1966  W. F. OTT ETAL  3,252,539
MULTI-BARREL CARBURETOR WITH ADJUSTABLE IDLE AIR BY-PASS
Filed March 9, 1962  2 Sheets-Sheet 1

INVENTOR.
WILLIAM F. OTT
JOHN H. KREIN
BY
AGENT

INVENTOR.
WILLIAM F. OTT
JOHN H. KREIN

AGENT

United States Patent Office 3,252,539
Patented May 24, 1966

3,252,539
MULTI-BARREL CARBURETOR WITH
ADJUSTABLE IDLE AIR BY-PASS
William F. Ott, Mundelein, Ill., and John H. Krein,
Florissant, Mo., assignors to ACF Industries, Incorporated, New York, N.Y., a corporation of New Jersey
Filed Mar. 9, 1962, Ser. No. 178,753
3 Claims. (Cl. 180—77)

This invention relates to means for controlling the speed of the internal combustion engine of an automotive vehicle having an accessory or accessories powered from the engine, adapted to prevent stalling of the engine under conditions of demand of the accessory or accessories which imposes increased load on the engine, and more particularly to speed control means of this character for the engine of an automotive vehicle equiped with such engine-powered accessories as an air conditioner and a power steering system.

It will be understood that such automotive vehicle accessory equipment as an air conditioner or a power steering accessory is powered by the engine of the vehicle and thereby increases the load on the engine. When an accessory such as an air conditioner is operating, or when an accessory such as a power steering accessory imposes a high demand on the engine, and the engine is idling, the load imposed on the engine may cause the idle speed of the engine to drop below that necessary to maintain the engine in operation, and the engine will stall.

Accordingly, among the several objects of this invention may be noted the provision of improved means for controlling the speed of the engine of an automotive vehicle equipped with one or more accessories powered from the engine which functions in response to operation of the accessory or accessories and resultant increased load on the engine to increase the engine idle speed to tend to prevent stalling of the engine; and the provision of such means which is economical to provide and reliable in operation. In general, the invention involves the provision of means responsive to operation of an accessory when the engine is idling for by-passing air around the throttle means of the means, such as a carburetor, for supplying a mixture of fuel and air to the engine, and for adding fuel to the air flowing through the by-pass to increase engine idle speed. In a more specific aspect of the invention, it is embodied in a multi-stage carburetor, such as a so-called four-barrel carburetor, the air by-pass being provided around the secondary throttles of the carburetor, and the additional fuel being supplied to the by-pass from the secondary high speed fuel circuit of the carburetor. A further feature of the invention as embodied in a multi-stage carburetor is the provision of an arrangement whereby the auxiliary fuel circuit for supplying fuel to the by-pass is utilized, when the by-pass is closed, to supply extra fuel to the secondary mixture conduits of the carburetor upon a fast acceleration demand. Other objects and features will be in part apparent and in part pointed out hereinafter.

Only so much of the construction as to a four-barrel carburetor as is essential to an understanding of this invention will be described herein. Reference may be made to Patent No. 2,890,030, for example, for such details as may be desired.

The invention accordingly comprises the constructions hereinafter described, the scope of the invention being indicated in the following claims.

In the accompanying drawings, in which several of various possible embodiments of the invention are illustrated, FIG. 1 is a vertical cross section of a four-barrel carburetor in which the invention is embodied, taken through a primary and a secondary mixture conduit of the carburetor, with certain parts further broken away and shown in section;

Corresponding reference characters indicate corresponding parts throughout the several views of the drawings.

Figure 1:
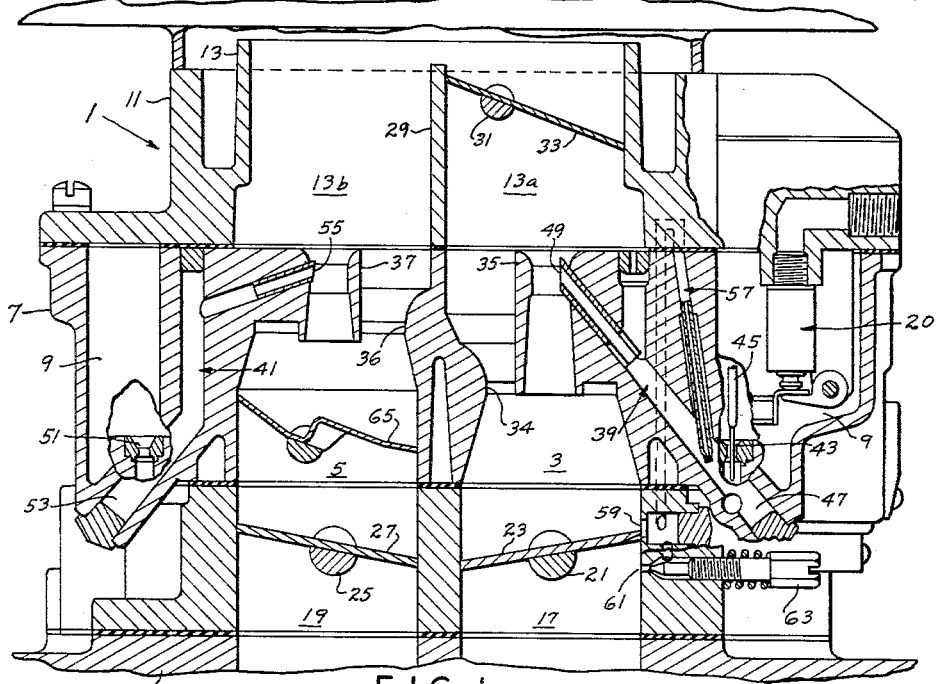
Figure 2:
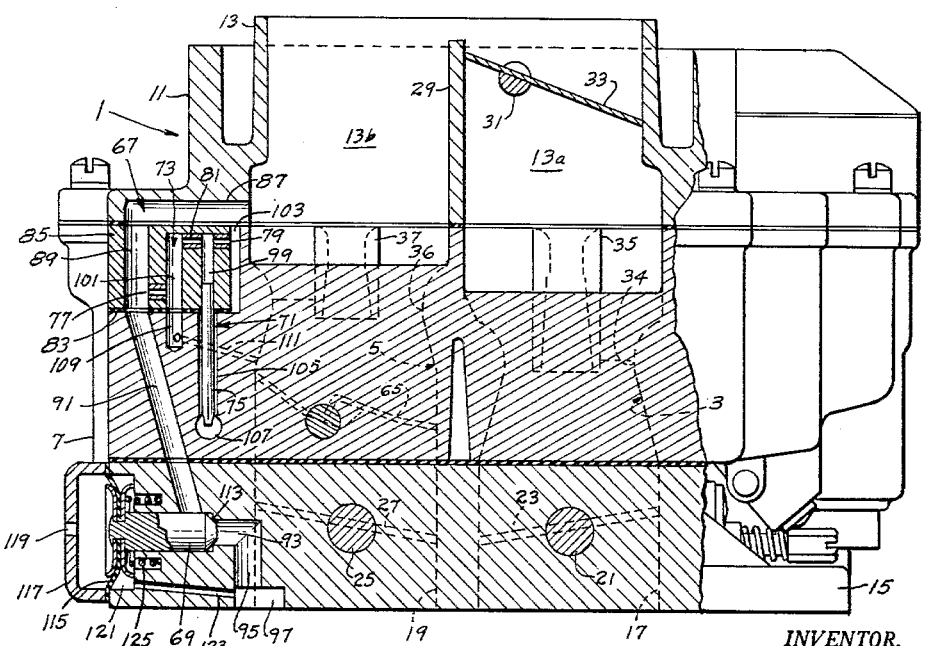
FIG. 2 is a vertical cross section of the four-barrel carburetor, taken in a central vertical plane between the primary mixture conduit and the secondary mixture conduit on one side of the carburetor and the primary mixture conduit and the secondary mixture conduit on the other side of the carburetor, and showing a first embodiment of the invention.

Referring to FIGS. 1 and 2 of the drawings, there is generally indicated at 1 a multi-stage multi-barrel carburetor which is modified in accordance with this invention to provide for increase in engine idle speed in response to operation of an engine-powered accessory, such as an air conditioner. This carburetor may be a multi-stage carburetor of the type conventionally referred to as a four-barrel carburetor, having a primary stage comprising two primary mixture conduits or barrels such as indicated at 3 in FIGS. 1 and 2, and a secondary stage comprising two secondary mixture conduits or barrels such as indicated at 5 in FIGS. 1 and 2. As shown, the carburetor comprises a main body 7 formed to provide the four mixture conduits or barrels and the usual pair of fuel bowls 9, a bowl cover 11 having the usual air horn 13 through which air may flow to the mixture conduits, and a throttle body 15 having the usual primary and secondary throttle bores such as indicated at 17 and 19 coaxial with and in continuation of the respective mixture conduits. Flow of fuel to each fuel bowl is under control of a typical float valve such as indicated at 20. A primary throttle shaft 21 extends across the primary mixture conduits and carries the usual primary throttle valves such as indicated at 23. A secondary throttle shaft 25 extends across the secondary mixture conduits and carries the usual secondary throttle valves such as indicated at 27. The air horn 13 is divided into a primary air inlet 13a and a secondary air inlet 13b by a partition 29. Extending across the primary air inlet 13a is the usual choke valve shaft 31 carrying the usual choke valve 33.

Each primary mixture conduit 3 is formed to provide a main venturi 34, and has a typical boost venturi 35 therein. Similarly, each secondary mixture conduit is formed as a main venturi 36 and has a boost venturi 37 therein. As will be understood, the carburetor has a high-speed fuel system including a primary high-speed circuit, such as generally indicated at 39, for supplying fuel to the boost venturis in the primary mixture conduits, and a secondary high-speed circuit, such as generally indicated at 41 for supplying fuel to the boost venturis in the secondary mixture conduits. Here it will be understood that the secondary throttles 27 remain closed until the primary throttles 23 are opened a predetermined amount, then open up as the primary throttles are further opened, and reach wide open position when the primary throttles reach wide open position. In general, as to each primary mixture conduit, the primary high speed circuit comprises a metering jet 43 through which fuel may flow from a respective fuel bowl 9 under control of a metering rod 45 to a passage 47 for delivery through a fuel nozzle 49 into the respective primary boost venturi 35. In general, as to each secondary mixture conduit, the secondary high speed circuit comprises a metering jet 51 through which fuel may flow from a respective fuel bowl to a passage 53 for delivery through a fuel nozzle 55 into the respective secondary boost venturi 37. A typical idle system for supplying air/fuel mixture to the engine under idling conditions via the primary throttle bores is generally indicated at 57. This includes the usual idle ports 59 and 61 in each primary throttle bore 17 and the usual idle adjusting screw 63 for each idle port 61. Each secondary mixture conduit 5 has the usual velocity valve 65 therein.

In accordance with a feature of this invention, means are provided for supplying an additional air and fuel mixture via the secondary stage of the carburetor in response to demand due to operation of an engine-powered accessory, such as an air conditioner or a power steering accessory. As shown in FIG. 2, a by-pass indicated in its entirety by the reference numeral 67 is provided around the velocity valves 65 and the secondary throttle valves 27. A valve for controlling flow through this by-pass is indicated at 69. This valve is normally closed at high manifold vacuum conditions and is adapted to open in response to reduction of vacuum below the primary and secondary throttles 23 and 25 such as occurs under engine idling conditions when the load on the engine is abnormally increased, as by reason of operation of an air conditioner or a steering assist powered by the engine. This results in the engine slowing down. Fuel is adapted to be supplied to this by-pass for mixing with air flowing through the by-pass when valve 69 is open by an auxiliary fuel system such as generally indicated at 71.

Auxiliary fuel system 71 comprises a fuel delivery passage 73 for delivering fuel picked up in a fuel tube 75 from the secondary high-speed circuit to by-pass 67 whenever by-pass valve 69 is open and velocity valves 65 and secondary throttles 27 are at their curb idle position. Passage 73 has a restriction or fuel delivery jet 77 at its end in communication with by-pass 67 so that, when by-pass valve 69 is open and air is flowing through by-pass 67, delivery of fuel via passage 73 to by-pass 67 occurs. Air from air horn 13 passes into air space 103 and through an air bleed 79 into passage 73. A restriction jet 81 is provided in passage 73. Air bleeding through the air bleed 79 mixes with fuel flowing up from tube 75, and the resultant air/fuel mixture flows through restriction jet 81 which functions as an economizer to speed up the flow of the air and fuel and facilitate the intermixture thereof.

More particularly, the main body of the carburetor has a recess 83 at the top and on the secondary side. A block 85 is secured in this recess. The by-pass 67 is constituted by a groove 87 extending from the secondary air inlet 13b along the bottom of the bowl cover 11, a vertical passage 89 in the block, an inclined passage 91 in the main body 7 and throttle body 15, a horizontal passage 93 in the throttle body extending inward from the lower end of inclined passage 91, and a vertical passage 95 extending down from the inner end of horizontal passage 93 to a recess 97 in the bottom of the throttle body, this recess providing for communication with the intake manifold 98 of the engine. The block 85 has vertical holes 99 and 101 extending up from its bottom and terminating short of the top of the block. There is an air space at 103 at the inner side of block 85 open at the top to groove 87, and air bleed 79 is constituted by a restriction jet in a hole in the block providing for restricted communication between this air space and the upper end of hole 99. The restriction jet or economizer 81 is provided in a continuation of the hole for air bleed jet 79 providing for restricted communication between the upper ends of holes 99 and 101. Fuel delivery jet 77 is provided in a hole in the block adjacent its bottom providing communication between hole 101 and vertical passage 89 in the block. Fuel tube 75 extends down from hole 99 into a fuel well 105 in the main body which, at its lower end, is in communication with the fuel passage 53 of the secondary high speed circuit of the carburetor via a cross-connecting passage 107. The main body 7 has a vertical hole 109 extending down from hole 101 in block 85 and cross-passages such as indicated at 111 interconnecting hole 109 and the exit ends of the main venturi formations in the secondary mixture conduits 5.

The by-pass valve 69 is horizontally slidable in a hole of larger diameter than horizontal passages 93 extending outward from the latter, and the forward end of valve 69 (its right end as viewed in FIG. 2) is of conical form adapted to seat against a valve seat 113 formed at the outer end of horizontal passage 93. At its outer end, valve 69 is connected to the center of a flexible diaphragm 115 having its margin clamped against the throttle body 15 by a cup 117. The latter has a hole 119 for exposure of the outside of the diaphragm to atmospheric pressure. The throttle body has a recess 121 for accommodating the diaphragm, and this constitutes a vacuum chamber which is adapted for communication with the intake manifold 98 of the engine via a vacuum passage 123 extending to recess 97. A spring 125 biases valve 69 outward in valve-opening direction. Atmospheric pressure in cup 117 on the outside of the diaphragm is adapted to hold valve 69 closed against the opening bias of spring 125 as long as vacuum in chamber 121 is below a predetermined value, and when vacuum in chamber 121 drops to this value (i.e., when pressure in chamber 121 rises to a predetermined value), spring 125 overcomes the force tending to hold the valve 69 closed on account of the differential in atmospheric pressure on the outside and inside of the diaphragm, and valve 69 thereupon opens.

Operation is as follows:

When the engine of the vehicle, on which the carburetor 1 is used, is idling, a relatively high vacuum, for example, in the order of 18 inches of mercury is drawn in the intake manifold 98 of the engine since the primary throttles 23 are closed or substantially closed and the secondary throttles 27 are closed. This high vacuum is transmitted via recess 97 and passage 123 to vacuum chamber 121, so that by-pass valve 69 is held closed against the bias of spring 125 by the effect of atmospheric pressure on the outside of diaphragm 115. Under such circumstances, by-pass 67 is closed.

When the engine is idling, and a relatively heavy load is placed on the engine by an accessory powered by the engine, the engine will normally slow down, and the vacuum in the intake manifold will drop as a result of such slow-down to a value in the order of 14 or 15 inches of mercury, for example. The operation of an air conditioner, the compressor of which is driven by the engine, imposes a relatively heavy load on the engine and will thus normally decrease engine idling speed, and intake manifold vacuum. High demand from a power steering system, such as occurs on cramping the front wheels of the vehicle, similarly imposes a relatively heavy load on the engine which will normally decrease engine speed and intake manifold vacuum to some value between 12 inches and 18 inches of negative pressure.

Spring 125 is chosen with a value to open valve 69 when the manifold vacuum in chamber 121 drops to a value below 18 inches of mercury, for example. Air is then sucked into the manifold through the by-pass 67 from secondary air inlet 13b around the velocity valves 65 and the secondary throttles 27 to the intake manifold. The drop in pressure in by-pass 67 causes fuel to be drawn from well 105 through fuel tube 75, restriction 81, through fuel delivery passage 73 and out fuel delivery jet 77 to the by-pass 67 for delivery to the intake manifold. Air is bled into the fuel at bleeds 79 and 111 and restriction 81 acts as an economizer as above described. In this manner, additional air/fuel mixture is delivered to the intake manifold via by-pass 67 to cause the engine to speed up, thereby tending to avoid stalling of the engine or rough idling, when a load is put on the engine during idle.

Upon fast acceleration of the vehicle after the engine is warm, all the throttles and velocity valves 65 in the secondary side open, and valve 69 remains open due to low manifold vacuum. The flow of air through the main secondary venturi restriction 36 causes a pressure depression at the end of passage 111 opening into the conduit 5. Fuel is thus drawn up through fuel tube 75, and delivered to the secondary mixture conduits 5 via passage 99, economizer 81, passages 101, 109 and 111. Under these circumstances, jet 77 acts as an air bleed, in addition to bleed 79, which retains its function as an air bleed, since manifold vacuum in passage 89 is less than that in passage 111 under these conditions of engine operation.

At high cruising speeds, the throttle and velocity valves on the secondary side will be at least partially open and due to the increased manifold vacuum resulting from reduced engine load the valve 69 will be moved by atmospheric pressure to its closed position. When valve 69 closes, the flow of fuel and air mixture switches from passage 67 to passage 111 providing a continuation of mixture flow from passage 99 to the intake manifold.

Reversing the flow of mixture from passage 67 to passage 111 serves to prevent engine hesitation or bumping when the throttle and velocity valves open under closed condition of valve 69. When the throttle and velocity valves open there is a rush of air through the boost venturi 37 reducing the pressure within the boost venturi and starting a rush of fuel from the high-speed secondary fuel circuit 41 to the boost venturi. The momentary lapse of time before the fuel reaches and starts flowing from fuel nozzle 55 allows a volume of pure air to flow into the intake manifold leaning the mixture to the point that it will not ignite or will ignite poorly. This is known as "engine hesitation" or "coughing."

As stated above, an immediate reversal of the fuel flow from passage 67 to passage 111 allows an amount of rich mixture to flow into the throttle bore. This rich mixture combines with the volume of air and forms a correct mixture eliminating engine hesitation or coughing.

Figure 3:
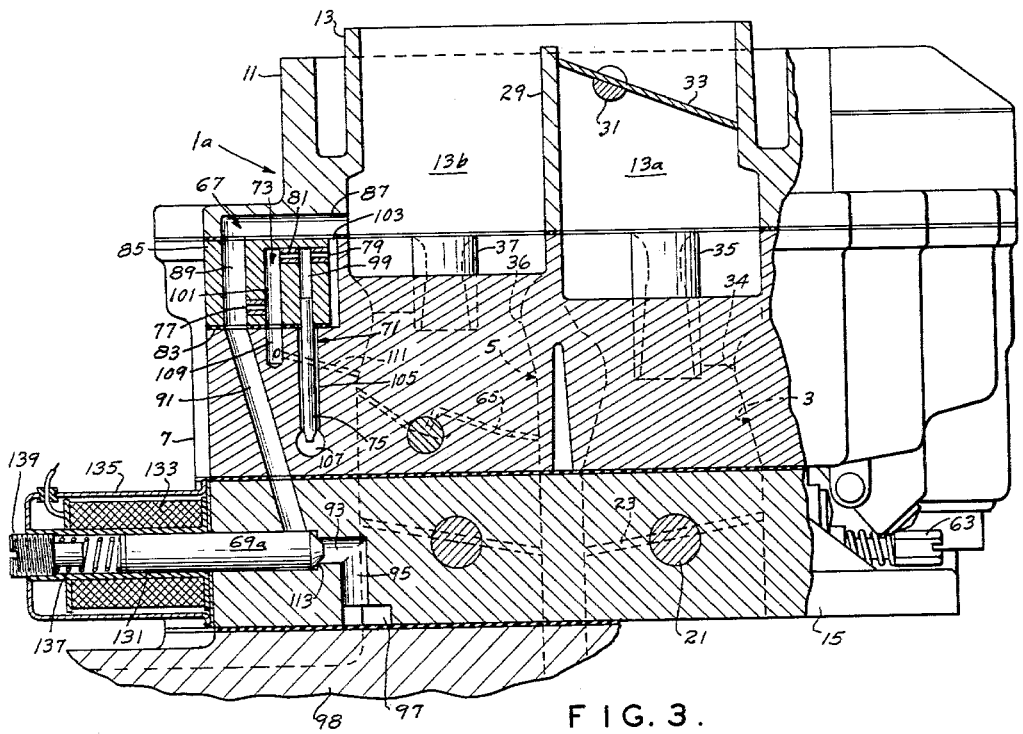
FIG. 3 is a view similar to FIG. 2 showing a modification.

FIG. 3 illustrates a modification which is in all respects like the embodiment of the invention shown in FIG. 2 except that the by-pass valve, instead of being controlled by vacuum downstream from the throttles, is operated by a solenoid. The FIG. 3 carburetor is designated 1a to distinguish it from the carburetor 1 of FIG. 2. In FIG. 3 the by-pass valve is designated 69a to distinguish it from the valve 69 of FIG. 2 and, as shown in FIG. 3, constitutes a plunger extending outward from the throttle body 15 into the core 131 of a solenoid 133 in a case 135 attached to the throttle body. A coil compression spring 137 biases the valve closed, and the closing bias of spring 137 is adjustable by means of a plug 139 adjustably threaded in the outer end of the core 131. Valve 69a opens against the bias of spring 137 on energization of the solenoid.

Figure 4:
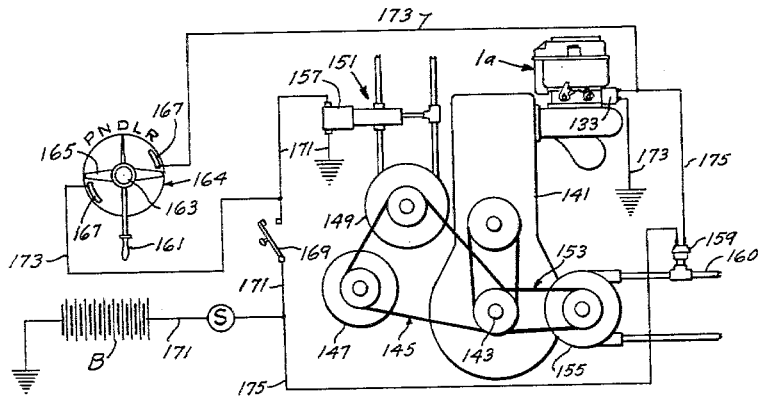
FIG. 4 is a wiring diagram for the FIG. 3 embodiment.

FIG. 4 shows how solenoid 133 may be connected for opening valve 69a in response to operation of an air conditioner or high demand from a power steering accessory. In FIG. 4, the engine of the automotive vehicle is indicated at 141, and the crankshaft of the engine is indicated at 143. The crankshaft, via a belt and pulley drive 145, drives the usual generator 147 and the compressor 149 of an air conditioner 151. The crankshaft, via another belt and pulley drive 153, drives a hydraulic pump 155 for supplying hydraulic fluid under pressure for operating a power steering gear (not shown). Air conditioner 151 includes a solenoid valve 157 which controls the operation of the air conditioner. A pressure switch 159 is connected in delivery line 160 of the pump 155. Carburetor 1a is shown in FIG. 4, and its solenoid appears at 133. There is indicated at 161 in FIG. 4 a typical transmission selector lever, pivoted at 163, and carrying a switch 164 having a blade 165 adapted to complete a circuit across fixed conduits 167 when lever 161 is in the N or P positions (the neutral transmission positions). An air conditioner control switch is indicated at 169. This is connected in series with battery B of the vehicle and the air conditioner solenoid valve 157 as indicated at 171, the arrangement being such that closing switch 169 places the air conditioner in operation. The switch 164 constituted by blade 165 and contacts 167 is series-connected with solenoid 133 in a circuit indicated at 173 which is connected in parallel around solenoid valve 157. Pressure switch 159 is connected in series with battery B and solenoid 133 as indicated at 175.

As will appear from FIG. 4, with the vehicle stopped and transmission selector lever 161 in the N or P position to close switch 164 and when switch 169 is closed for operation of the air conditioner, solenoid 133 is energized to open the by-pass valve 69a, thereby supplying additional air/fuel mixture via the by-pass 67 (the same as described above in regard to carburetor 1 of FIG. 2) to increase engine idle speed to tend to prevent stalling of the engine. Pressure switch 159 is adapted to close upon increase of pressure in line 160 to a predetermined value, such as occurs on cramping the front wheels of the vehicle, thereby energizing solenoid 133 to open valve 69a and increase engine idle speed to tend to prevent stalling. This occurs independently of the setting of transmission selector lever 161 and the air conditioner control switch 169.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In an automotive vehicle having an internal combustion engine providing a source of vacuum, an accessory powered by the engine adapted to cause a change in said vacuum, a carburetor comprising mixture conduit means for supplying a mixture of air and fuel to the engine, said carburetor having an idle fuel system interconnected with said mixture conduit means, throttle means in said mixture conduit means, an air by-pass around and exclusive of said throttle means, a valve in said by-pass, a diaphragm connected to said valve and being responsive to drop in vacuum downstream from said throttle means for opening said valve and by-passing air around and exclusive of said throttle means in the curb idle position thereof, an auxiliary fuel system formed in said carburetor, a port interconnecting said auxiliary fuel system with said by-pass for adding fuel to said air to increase engine idle speed.

2. In an automotive vehicle having an internal combustion engine providing a source of manifold vacuum, an accessory powered by the engine and adapted to produce a change in the manifold vacuum when energized, a carburetor having mixture conduit means for supplying a mixture of fuel and air to an engine and throttle means for said mixture conduit means, said carburetor holding a supply of fuel and having a fuel circuit means including a primary fuel circuit and an idle fuel circuit for delivering fuel from the supply to said mixture conduit means, said carburetor having an air by-pass around and exclusive of said throttle means, a valve in said by-pass, said valve being normally opened, a diaphragm connected to the valve and being responsive to a predetermined change in said manifold vacuum downstream from said throttle means for closing said valve, and an auxiliary fuel circuit for delivering fuel from said supply to said by-pass when said valve is open and air is flowing through said by-pass.

3. In a carburetor for an internal combustion engine and having a primary stage including primary mixture conduit means and primary throttle means therein, an idle system associated with the primary mixture conduit, a secondary stage including secondary mixture conduit means and secondary throttle means therein, said carburetor holding a supply of fuel and having a primary fuel circuit for delivering fuel from said supply to said primary mixture means, and a secondary fuel circuit for delivering fuel from said supply to said secondary mixture conduit means, said carburetor having an air by-pass around and exlcusive of said secondary throttle means, a valve for said by-pass, and an auxiliary fuel circuit for delivering fuel from said secondary fuel circuit to said by-pass when said valve is open, an air bleed for bleeding air into said auxiliary fuel circuit from upstream of said secondary throttle means, said auxiliary fuel circuit including a passage to said secondary mixture conduit means for the passing of air or fuel therethrough in response to engine operation, an air bleed for bleeding air into said auxiliary fuel circuit, and an economizer in said auxiliary fuel circuit, said auxiliary fuel circuit having a restricted opening into said by-pass, said passage connecting into said auxiliary fuel circuit downstream of said economizer, said restricted opening acting as a fuel jet when said valve is open and as an air bleed when said valve is closed and fuel is delivered by said auxiliary fuel circuit to said secondary mixture means.

References Cited by the Examiner

UNITED STATES PATENTS

| | | | |
|---|---|---|---|
| 2,890,030 | 6/1959 | Gordon | 261—22 |
| 2,929,226 | 3/1960 | Baker et al. | 62—243 X |
| 3,022,849 | 2/1962 | Braun | 180—77 |
| 3,042,134 | 7/1962 | Majewski | 180—77 |
| 3,103,128 | 9/1963 | Gordon. | |
| 3,146,844 | 9/1964 | Carlson | 180—77 |

OTHER REFERENCES

Carter 4-Barrel Carburetor, Model AFB. "1961 Buick Chassis Service Manual," pages 3–37 to 3–40. Sept. 5, 1961.

BENJAMIN HERSH, *Primary Examiner.*

PHILIP ARNOLD, A. HARRY LEVY, *Examiners.*

E. E. PORTER, *Assistant Examiner.*